(12) United States Patent
McLaughlin et al.

(10) Patent No.: US 11,972,699 B1
(45) Date of Patent: Apr. 30, 2024

(54) VIRTUALIZED EDUCATION SYSTEM THAT TRACKS STUDENT ATTENDANCE AND PROVIDES A REMOTE LEARNING PLATFORM

(71) Applicants: Nathaniel McLaughlin, Richardson, TX (US); Janice Blackmon, Flower Mound, TX (US)

(72) Inventors: Nathaniel McLaughlin, Richardson, TX (US); Janice Blackmon, Flower Mound, TX (US)

( * ) Notice: Subject to any disclaimer, the term of this patent is extended or adjusted under 35 U.S.C. 154(b) by 0 days.

(21) Appl. No.: 17/521,638

(22) Filed: Nov. 8, 2021

Related U.S. Application Data

(60) Provisional application No. 63/083,286, filed on Sep. 25, 2020.

(51) Int. Cl.
*G09B 5/06* (2006.01)
*G06V 40/16* (2022.01)
*G09B 5/10* (2006.01)

(52) U.S. Cl.
CPC ............ *G09B 5/065* (2013.01); *G06V 40/172* (2022.01); *G09B 5/10* (2013.01)

(58) Field of Classification Search
CPC ................ G09B 5/06; G09B 5/10; G06K 9/00
See application file for complete search history.

(56) References Cited

U.S. PATENT DOCUMENTS

| | | | | |
|---|---|---|---|---|
| 8,353,705 B2 * | 1/2013 | Dobson | ................ | G09B 19/00 340/5.5 |
| 2003/0073064 A1 * | 4/2003 | Riggs | ..................... | G09B 5/00 434/350 |
| 2004/0151347 A1 * | 8/2004 | Wisniewski | ........... | G06V 40/16 382/115 |
| 2012/0069131 A1 * | 3/2012 | Abelow | ............ | G06Q 30/0601 345/589 |
| 2013/0280689 A1 * | 10/2013 | Meer | ....................... | G09B 5/06 434/350 |
| 2013/0330704 A1 * | 12/2013 | Creamer | .................. | G09B 7/00 434/362 |
| 2014/0370484 A1 * | 12/2014 | Hermosura | ............. | G09B 7/02 434/350 |
| 2016/0117944 A1 * | 4/2016 | Sun | ........................ | G09B 7/02 434/350 |
| 2016/0232774 A1 * | 8/2016 | Noland | .................. | G08B 25/10 |

* cited by examiner

*Primary Examiner* — Eddy Saint-Vil
(74) *Attorney, Agent, or Firm* — Plager Schack LLP; Mark H. Plager; Stephen Hallberg

(57) ABSTRACT

A virtualized education system that tracks student attendance and provides a remote learning platform is disclosed. The virtualized education system is a software-based system that tracks student attendance and provides a remote learning platform for tracking and reporting on student attendance and time spent online accurately.

11 Claims, 6 Drawing Sheets

VIRTUALIZED EDUCATION SYSTEM THAT TRACKS STUDENT ATTENDANCE AND PROVIDES A REMOTE LEARNING PLATFORM

CLAIM OF BENEFIT TO PRIOR APPLICATION

This application claims benefit to U.S. Provisional Patent Application 63/081,794, entitled "VIRTUALIZED EDUCATION SYSTEM THAT TRACKS STUDENT ATTENDANCE AND PROVIDES A REMOTE LEARNING PLATFORM," filed Sep. 22, 2020. The U.S. Provisional Patent Application 63/081,794 is incorporated herein by reference.

BACKGROUND

Embodiments of the invention described in this specification relate generally to education systems, and more particularly, to a virtualized education system that tracks student attendance and provides a remote learning platform (implemented as a software-based system) and an online education student attendance process for tracking student attendance in connection with the remote learning platform.

Remote learning is a widespread way of providing education to students during COVID-19 pandemic and other future problems which may arise. Not only in pandemics, but remote education can be helpful to provide education resources and a consistent learning environment beyond traditional city centers and areas of population, such as may be needed in remote areas of developing countries. One of the problems with existing remote education systems is attendance of students who may log in and then disappear during instruction without a teacher aware of the student's absence since the student's computer may still be active and logged into the system.

Traditional attendance tracking systems are done manually or based on students being in physical buildings. There is not a product to track attendance for the virtual student. Thus, attendance tracking in a virtual education system is an ongoing problem.

Therefore, what is needed is a way for a school to track and report student attendance and time spent online accurately when the school provides a virtualized classroom solution and remote learning platform for students.

BRIEF DESCRIPTION

A novel virtualized education system that tracks student attendance and provides a remote learning platform and a novel online education student attendance process for tracking student attendance in connection with the remote learning platform are disclosed. In some embodiments, the virtualized education system is a software-based system that tracks student attendance and provides a remote learning platform tracks and reports on student attendance and time spent online accurately.

In some embodiments, the virtualized education system that tracks student attendance and provides a remote learning platform is implemented and deployed as a virtualized education attendance tracking and remote learning cloud application service. In some embodiments, the virtualized education attendance tracking and remote learning cloud application service supports (i) live teaching via camera feed, (ii) attendance tracking via facial recognition, (iii) a teacher portal whereby teachers are the primary content administrators of an academic portal and are able to create live session links, share recorded sessions and view attendance reports in addition to creating new places for students to discuss and collaborate, (iv) a student portal whereby students are the primary consumers of an academic portal in accessing information posted by teachers, attending live sessions, and discussing concepts, and (v) an administrator portal for classroom oversight and attendance tracking.

In some embodiments, the online education student attendance process for tracking student attendance in connection with the remote learning platform includes a plurality of steps comprising (i) a teacher scheduling an online session on the remote learning platform and inviting students to join the session, (ii) taking attendance as teachers and students join the session as scheduled, (iii) automatic identification of students present and detection of unauthorized attendees by a facial recognition system that is configured to actively and automatically deny access to unauthorized attendants and send notifications to contacts (parents, guardians, etc.) for students determined to be absent from the session, (iv) detecting attendee (student) movements to identify any attendee (student) who leaves their room and then determining whether the identified student has left their room for an amount of time beyond an pre-configured threshold allowed time of absence, and sending a notification to the contact(s) associated with the student when the time of absence from their room exceeds the threshold allowed time, and (v) providing an option for teachers to record, save, and make recordings available to students (or other teachers or administrators) to watch or re-watch the session. After the session is finished, the online education student attendance process disconnects all attendees to the particular session (while allowing their continued connection to the virtual education system, and generating a log and summary report information for the session which is available for the teacher via the teacher dashboard or an administrator via the administrator dashboard.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

Figure 1:
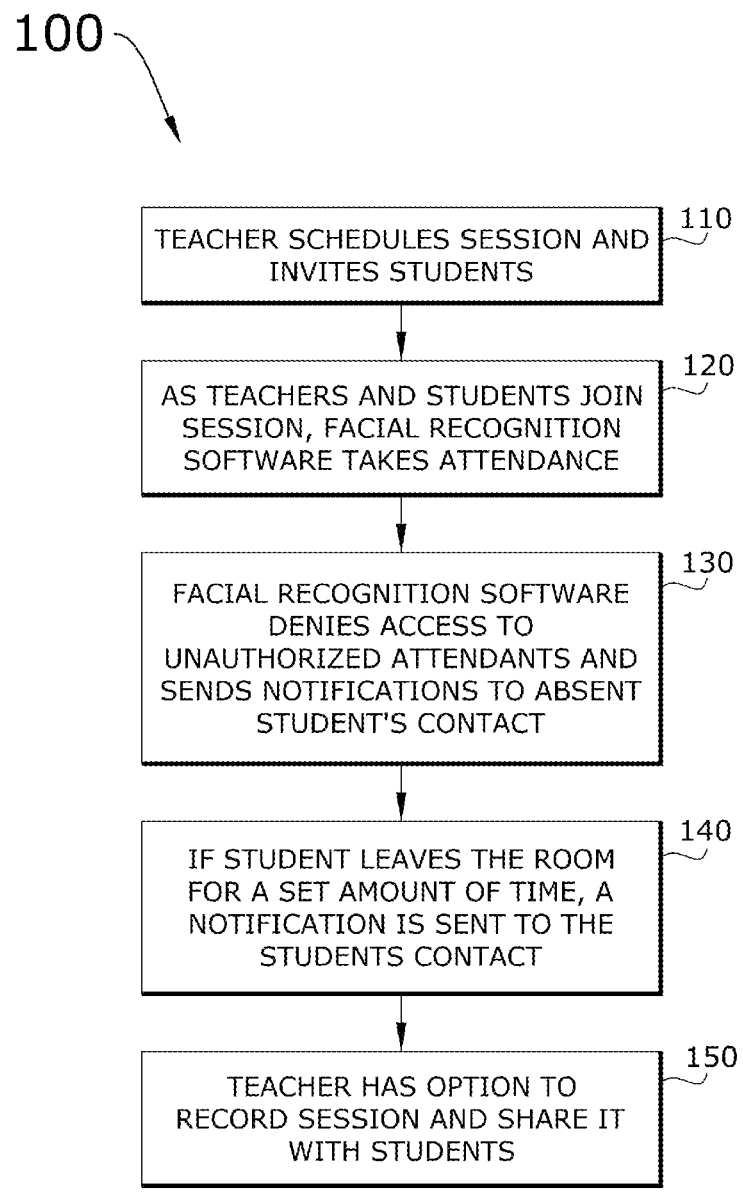

FIG. 1 conceptually illustrates an online education student attendance process in some embodiments for tracking student attendance in connection with the remote learning platform.

Figure 2:
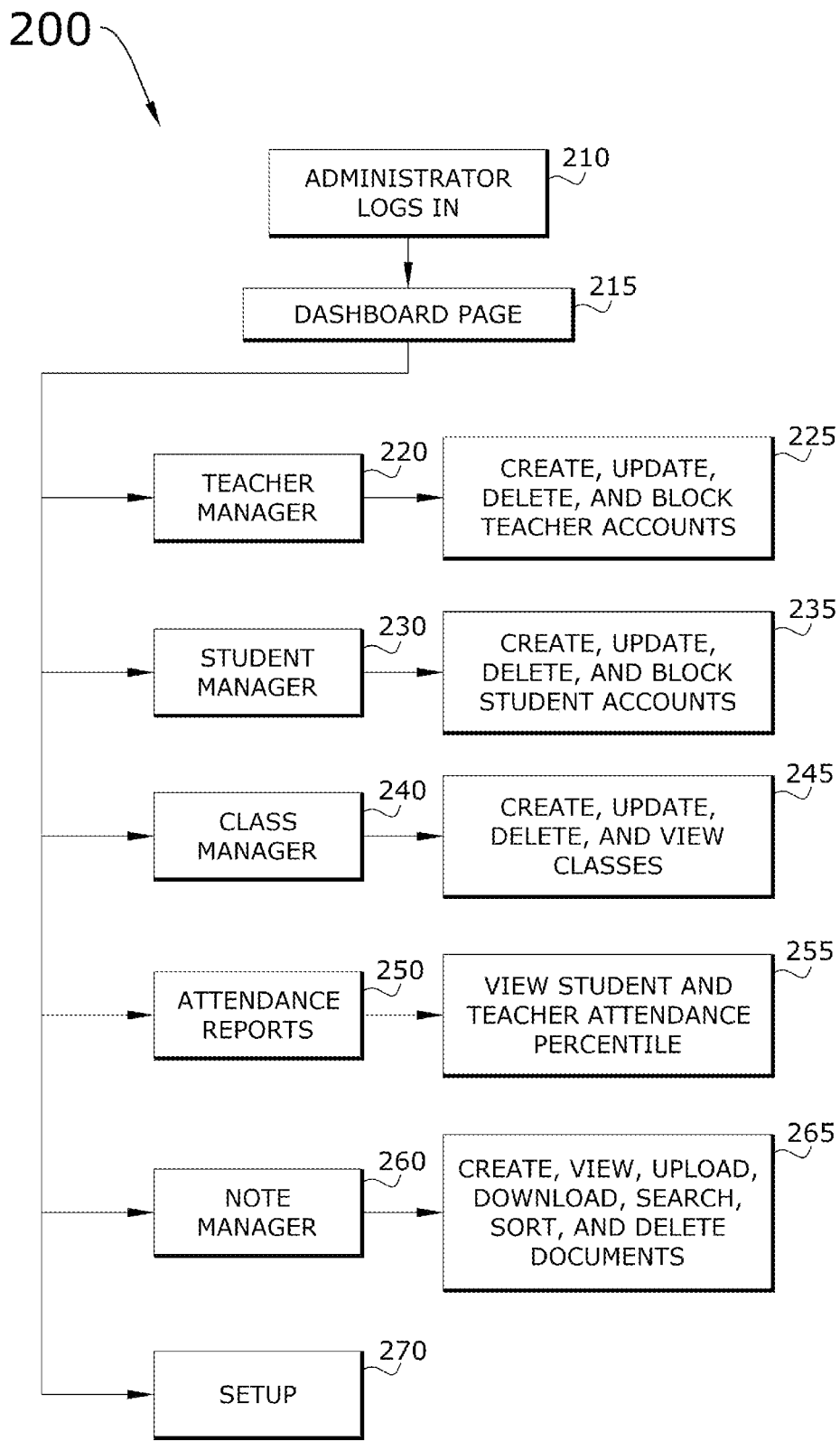

FIG. 2 conceptually illustrates a block diagram of an administrator dashboard and administrator functions accessible through the administrator dashboard in connection with a remote learning platform hosted by a virtualized education system in some embodiments.

Figure 3:
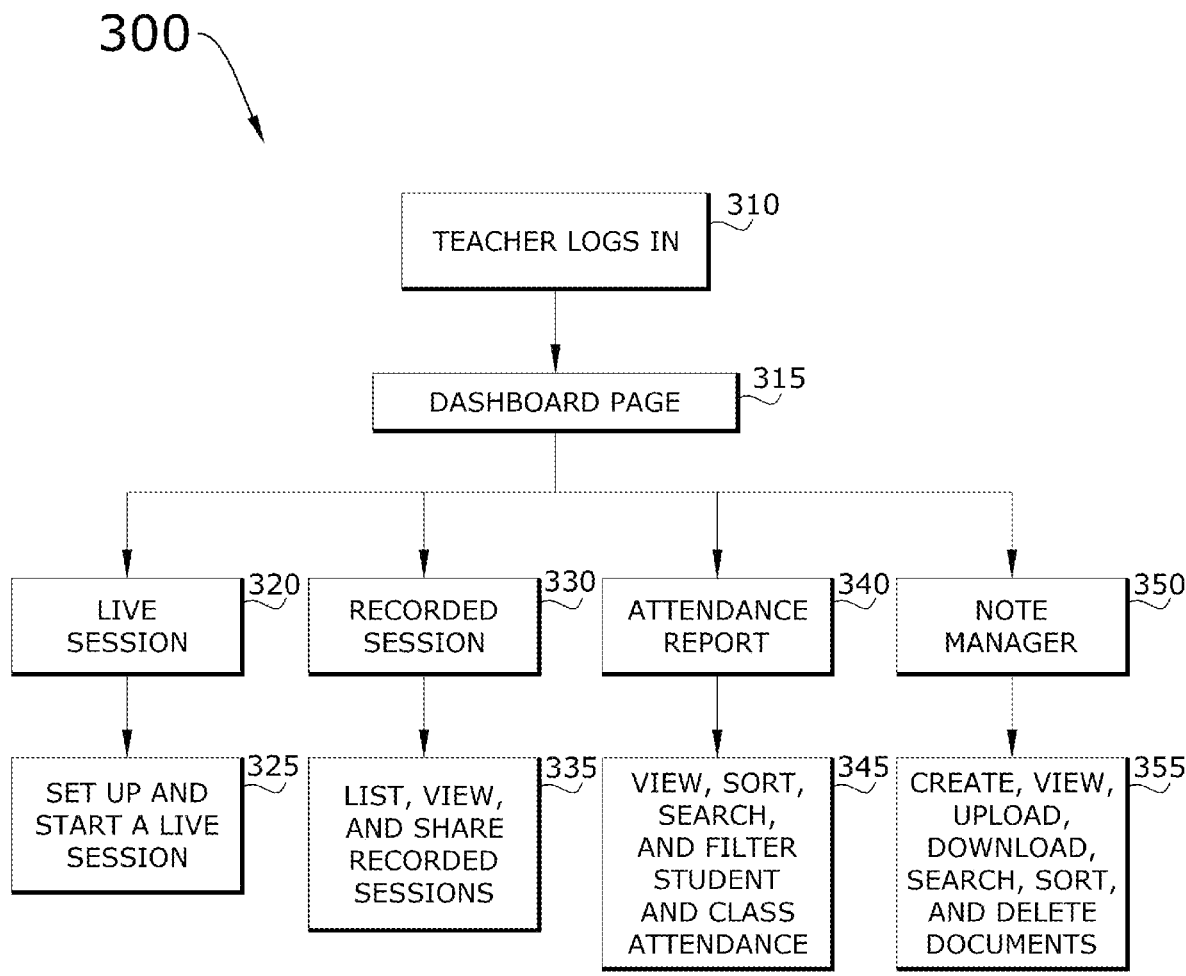

FIG. 3 conceptually illustrates a block diagram of a teacher dashboard and teacher functions accessible through the teacher dashboard in connection with the remote learning platform hosted by the virtualized education system in some embodiments.

Figure 4:
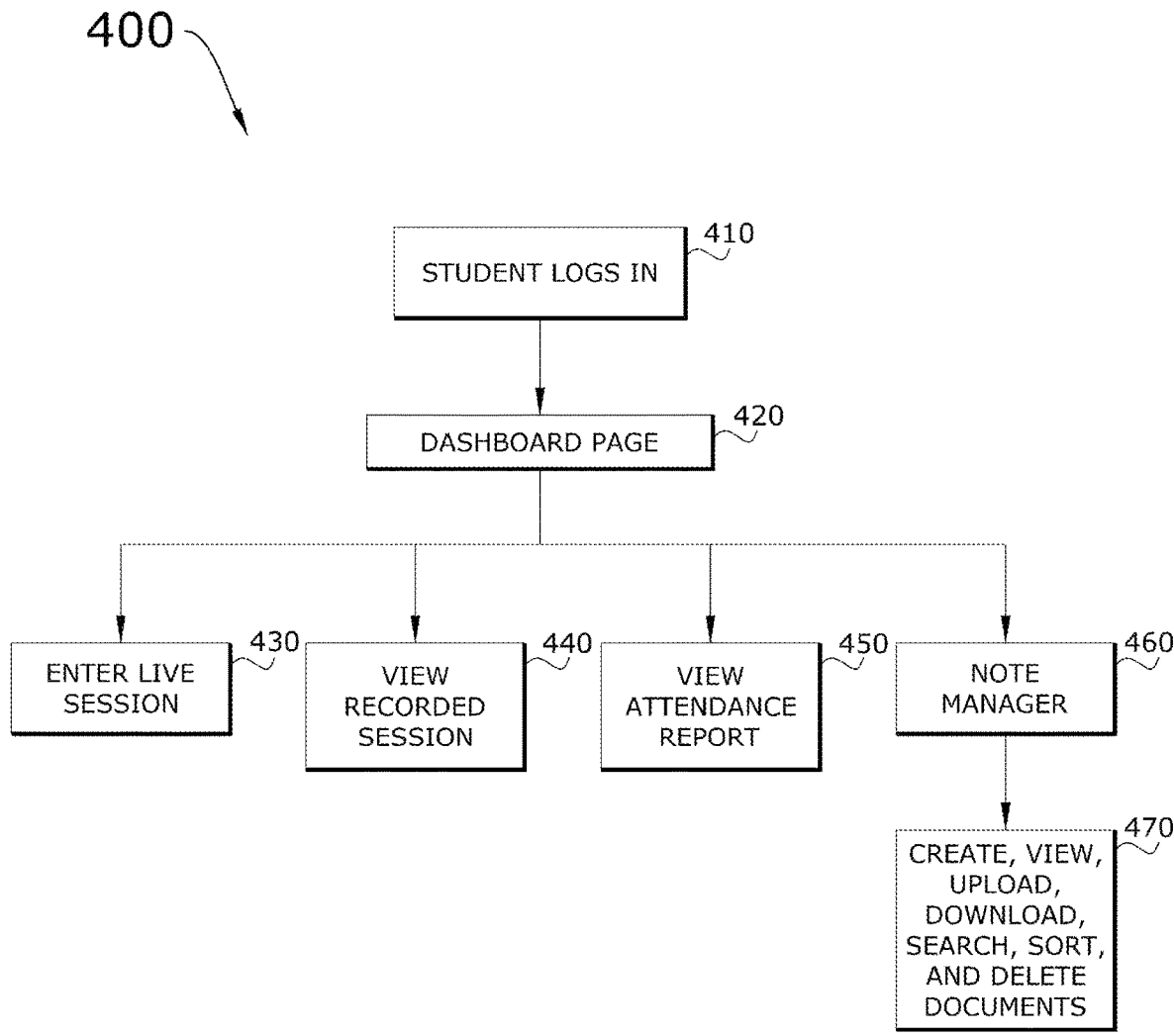

FIG. 4 conceptually illustrates a block diagram of a student dashboard and student functions accessible through the student dashboard in connection with the remote learning platform hosted by the virtualized education system in some embodiments.

Figure 5:
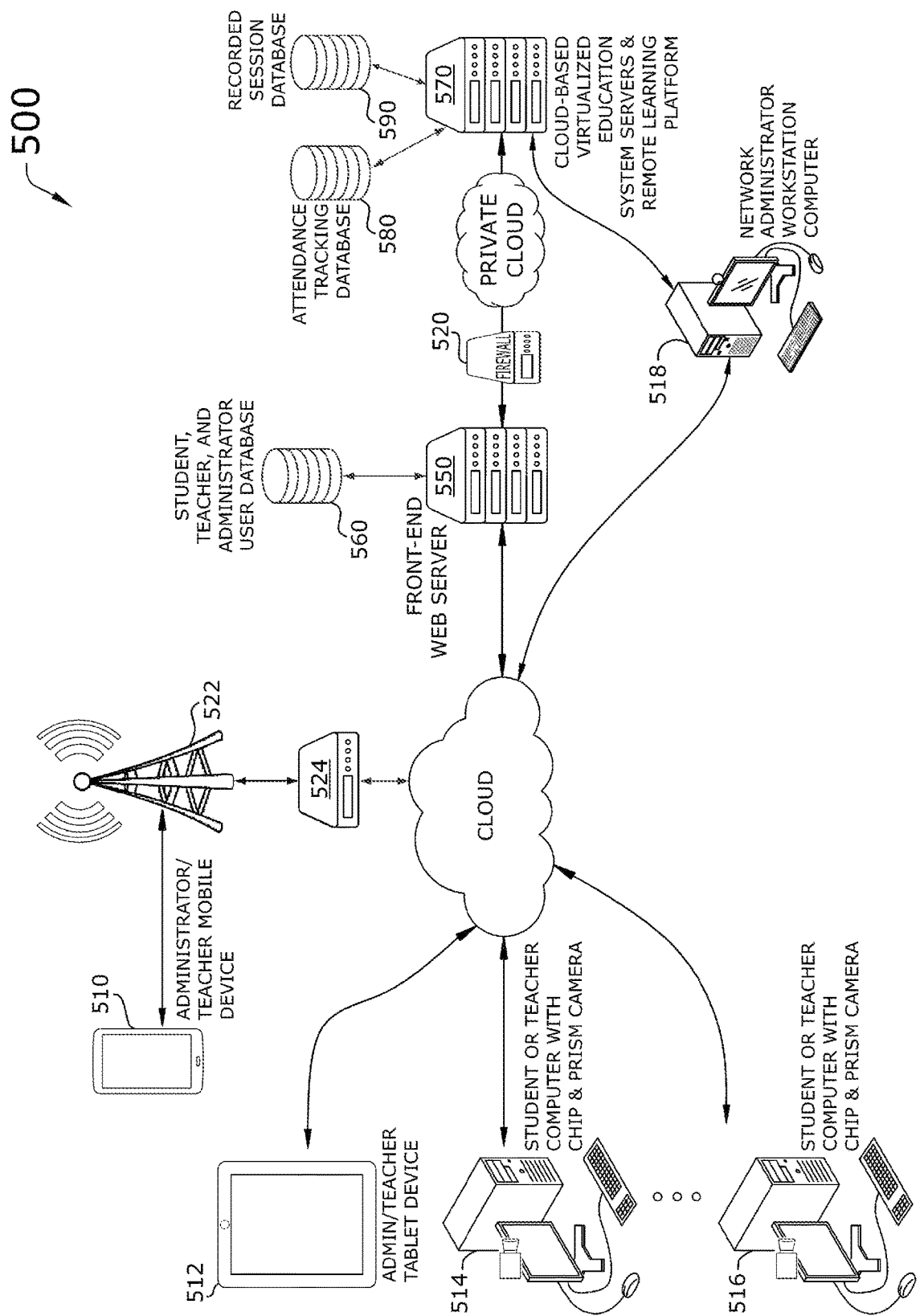

FIG. 5 conceptually illustrates a network architecture of a cloud-based virtualized education system that provides a remote learning platform in some embodiments.

Figure 6:
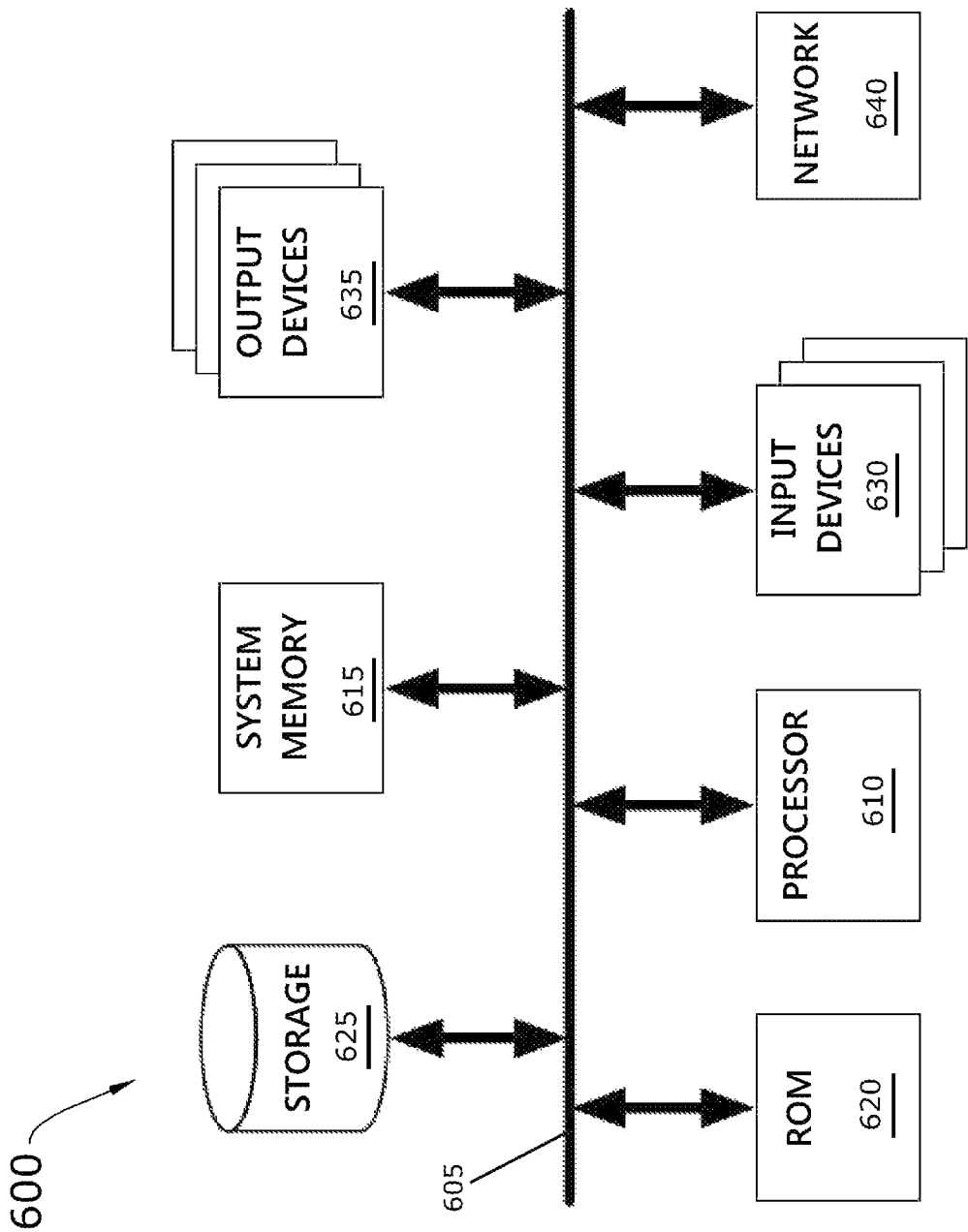

FIG. 6 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel virtualized education system that tracks student attendance and provides a remote learning platform. In some embodiments, the virtualized education system is a software-based system that tracks student attendance and provides a remote learning platform tracks and reports on student attendance and time spent online accurately.

In some embodiments, the virtualized education system that tracks student attendance and provides a remote learning platform is implemented and deployed as a virtualized education attendance tracking and remote learning cloud application service. In some embodiments, the virtualized education attendance tracking and remote learning cloud application service supports (i) live teaching via camera feed, (ii) attendance tracking via facial recognition, (iii) a teacher portal whereby teachers are the primary content administrators of an academic portal and are able to create live session links, share recorded sessions and view attendance reports in addition to creating new places for students to discuss and collaborate, (iv) a student portal whereby students are the primary consumers of an academic portal in accessing information posted by teachers, attending live sessions, and discussing concepts, and (v) an administrator portal for classroom oversight and attendance tracking.

In some embodiments, the online education student attendance process for tracking student attendance in connection with the remote learning platform includes a plurality of steps comprising (i) a teacher scheduling an online session on the remote learning platform and inviting students to join the session, (ii) taking attendance as teachers and students join the session as scheduled, (iii) automatic identification of students present and detection of unauthorized attendees by a facial recognition system that is configured to actively and automatically deny access to unauthorized attendants and send notifications to contacts (parents, guardians, etc.) for students determined to be absent from the session, (iv) detecting attendee (student) movements to identify any attendee (student) who leaves their room and then determining whether the identified student has left their room for an amount of time beyond an pre-configured threshold allowed time of absence, and sending a notification to the contact(s) associated with the student when the time of absence from their room exceeds the threshold allowed time, and (v) providing an option for teachers to record, save, and make recordings available to students (or other teachers or administrators) to watch or re-watch the session. After the session is finished, the online education student attendance process disconnects all attendees to the particular session (while allowing their continued connection to the virtual education system, and generating a log and summary report information for the session which is available for the teacher via the teacher dashboard or an administrator via the administrator dashboard.

In this specification, there are descriptions of processes or methods that are performed by software running on one or more computing devices (e.g., a desktop computer, a server, a laptop, a tablet computing device, a smartphone, a distributed network of computing devices, a customized computer architecture augmented by a specialized software application, etc.) to track student attendance and provide a remote learning platform, as well as to provide other features and function. In some cases, multiple software modules are deployed on multiple computing devices (both locally networked and inter-networked via distributed computing and/or cloud computing services). Additionally, multiple interfaces are provided through such software and software modules. Where the interfaces are specific user interfaces for specific users, permissions and settings of different users are supported by the virtualized education system. In this specification, at least three types of users are supported, including a student user, a teacher user, and an administrator user. These three types of users have different sets of permissions that are configured to visually output different user interfaces. For instance, an administrator user is configured to access and view an administrator dashboard, a teacher user is configured to access and view a teacher dashboard, and student users are configured to access and view student dashboards associated with their student identity, and perform remote learning activities, processes, and methods in sessions set up and scheduled by a teacher user, with several underlying automatic processes that perform attendance tracking, facial recognition, notifications, and reporting. Note, however, the types of users is not limited to three. Also, for the purposes of the embodiments described in this specification, the word "method" is used interchangeably with the word "process". Methods are described, therefore, by reference to example processes that conceptually illustrate process steps performed in connection with the virtualized education system for tracking student attendance and providing the remote learning platform.

As stated above, remote learning is a widespread way of providing education to students during COVID-19 pandemic and other future problems which may arise. Not only in pandemics, but remote education can be helpful to provide education resources and a consistent learning environment beyond traditional city centers and areas of population, such as may be needed in remote areas of developing countries. One of the problems with existing remote education systems is attendance of students who may log in and then disappear during instruction without a teacher aware of the student's absence since the student's computer may still be active and logged into the system. Also, traditional attendance tracking systems are done manually or based on students being in physical buildings. There is not a product to track attendance for the virtual student. Thus, attendance tracking in a virtual education system is an ongoing problem. Embodiments of the virtualized education system that tracks student attendance and provides a remote learning platform described in this specification solve such problems by utilizing a facial recognition system for daily attendance tracking as well as video setup for live and recorded sessions. Students will login with a unique ID ("UID"), a fingerprint (e.g., pressed to a touch screen interface), or facial recognition to verify their identity for classroom teaching. Then they can proceed according to the instructions of the teacher, etc.

Embodiments of the virtualized education system that tracks student attendance and provides a remote learning platform described in this specification differ from and improve upon currently existing options. In particular, traditional attendance tracking systems were not meant to be virtual, and therefore, are deficient for the needs of a virtualized environment. However, the virtualized education system that tracks student attendance and provides a remote learning platform described in this specification allows a school to track and report student attendance and time spent online accurately.

The virtualized education system that tracks student attendance and provides a remote learning platform of the present disclosure may be comprised of the following elements. This list of possible constituent elements is intended to be exemplary only and it is not intended that this list be used to limit the virtualized education system that tracks student attendance and provides a remote learning platform of the present application to just these elements. Persons having ordinary skill in the art relevant to the present disclosure may understand there to be equivalent elements that may be substituted within the present disclosure without changing the essential function or operation of the virtualized education system that tracks student attendance and provides a remote learning platform.

1. Admin Dashboard
2. Teacher Dashboard
3. Student Dashboard
4. Facial Recognition
5. Take Attendance The various elements of the virtualized education system that tracks student attendance and provides a remote learning platform of the present disclosure may be related in the following exemplary fashion. It is not intended to limit the scope or nature of the relationships between the various elements and the following examples are presented as illustrative examples only. The facial recognition and student sessions determine what day, time and amount of time spent at school "virtually". If they leave a predetermined area within the field of view, then they are reported as leaving the session or classroom. If they leave the room for a certain amount of time, then a parent or person identified as a contact person for the student is notified.

The virtualized education system that tracks student attendance and provides a remote learning platform of the present disclosure generally works by a software-based virtualized education attendance tracking and remote learning cloud application service that is configured for remote learning and education over a network that is enabled to provide (i) live teaching via camera feed, (ii) attendance tracking via facial recognition, (iii) a teacher portal whereby teachers are the primary content administrators of an academic portal and are able to create live session links, share recorded sessions and view attendance reports in addition to creating new places for students to discuss and collaborate, (iv) a student portal whereby students are the primary consumers of an academic portal in accessing information posted by teachers, attending live sessions, and discussing concepts, and (v) an administrator portal for principals, vice-principals, school board members, and other school administrators to track attendance and perform general school and classroom oversight and other administrator functions.

In some embodiments, the teacher portal shall start a live session and receive an attendance report of the attendees at the end every live session. The teacher shall view and share the recorded sessions with all/multiple students of his/her class. The teacher portal shall list the following functionalities: (a) live session in which the teacher shall start a live session and share it by sending an email invitation or by sharing the URL, (b) recorded session in which the teacher shall view the recorded sessions of his/her class and subject, and the teacher shall share the recorded sessions to all/multiple students by clicking a "Share" button, (c) attendance reporting in which the teacher shall view the attendance report of the classes he/she is assigned to, (d) manage notes functionality shall allow the teacher to maintain notes In some embodiments, the student portal shall have access to the live session and the recorded sessions sent by the teacher. The student shall view his/her attendance report. The following functionalities are provided to the student portal: (a) live session in which the student shall enter the live session by a URL or email invitation sent by the teacher, (b) recorded session in which the student shall view the recorded sessions sent by the teacher and perform basic operations on the recorded session such as play, pause, and rewind (this is useful for students with excused absences as well as regular, asynchronous learning, when assigned), (c) attendance report through which the student shall view his/her attendance report, and (d) manage notes where the student shall manage his/her notes. The student(s) and each teacher would need to have an electronic device (computing device, such as a computer, a tablet, or at least a smart phone). At that point, an internet browser is needed to launch the virtual classroom application. a built in camera is also needed for accurate facial recognition for attendance purposes.

To make the virtualized education system that tracks student attendance and provides a remote learning platform of the present disclosure, a person would create the system as a software-based system that provides a cloud service. As computer and camera technology improves, the software for the system would need regular updating to accommodate any new and emerging technologies. The software would need to support facial recognition for attendance tracking in education, as well.

To use the virtualized education system that tracks student attendance and provides a remote learning platform of the present disclosure, school districts across the United States could use this software to track attendance and validate the number of students in a virtual classroom setting for reporting sake.

Several more detailed embodiments of the virtualized education system and the online education student attendance process for tracking student attendance in connection with the remote learning platform are described below.

By way example, FIG. 1 conceptually illustrates an online education student attendance process 100 for tracking student attendance in connection with the remote learning platform hosted by a virtualized education system. As shown in this figure, the online education student attendance process 100 for tracking student attendance in connection with the remote learning platform starts when a teacher schedules an online session on the remote learning platform and invites students to join the session (at 110).

In some embodiments, one or more cloud servers of the virtualized education system hosts the remote learning platform and run session management software that enables teachers and students to connect to the remote learning platform over a private session and provides end-to-end encryption for student and teacher connections to each session. In some embodiments, one or more cloud servers of the virtualized education system runs facial recognition software that is enabled for any session scheduled by a teacher for students to connect and be identified (by facial recognition) to accurately track student attendance for the session. In some embodiments, each student and teacher operate a computing device to connect to a session. In some embodiments, each computing device operated by students and teachers is equipped with a chip and prism video camera that uniquely identifies hardware of the computing device and transmits the unique hardware ID to the facial recognition software running on the cloud server. In this way, the facial recognition software is able to load one or profile images of a student or a teacher who is associated with the computing device (determined by the unique hardware ID). In this way, the facial recognition software can identify when non-recognized users are viewable and block them out or disable the session for that particular computing device if necessary to protect privacy and ensure a safe learning environment. In some embodiments, the facial recognition software includes a smart, machine learning module that continually learns to recognize students and teachers via different views and images provided through the chip and prism camera. In this way, students and teachers can be identified and accurately recognized as they grow and age, change hairstyles, etc. In addition to these security features and user identification/attendance tracking features, the chip and prism camera is configured to capture and stream students and teachers to allow aggregation of the streams from all of the connected computing devices and provide a way to view the entire workroom. Furthermore, the chip and prism camera is configured for remote control by the teacher running the session or administrator users. In particular, the chip and prism camera can be remotely disabled by the teacher or administrator if there is a stranger in the room or if a child is cheating or not working.

After scheduling the online session on the remote learning platform and inviting students to join the session (at 110) and as teachers and students join the session as scheduled, the online education student attendance process 100 takes attendance (at 120). In some embodiments, the facial recognition software running on the server of the virtualized education system is utilized to identify students in attendance. Additionally, while taking attendance, the facial recognition software actively and automatically denies access to unauthorized attendants and sends notifications to contacts (parents, guardians, etc.) for students determined to be absent from the session (at 130).

In some embodiments, if a student leaves their room for a set amount of time, the online education student attendance process 100 sends a notification to the contact associated with the student (at 140). In some embodiments, the online education student attendance process 100 allows teachers the option of recording the session and sharing the recorded session with students (at 150). After the session is finished, all connections are ended by the cloud server and summary report information is tallied in a log for the session which is available for an administrator via an administrator dashboard, described next by reference to FIG. 2, and for the teacher via a teacher dashboard, described further below by reference to FIG. 3.

By way of another example, FIG. 2 conceptually illustrates a block diagram of an administrator dashboard and administrator functions 200 accessible through the administrator dashboard in connection with the remote learning platform hosted by the virtualized education system. To access the administrator dashboard and administrator functions 200, a user with administrator permissions logs into the remote learning platform (at 210). Examples of users with administrator permissions include, without limitation, a school administrator, a principal, a vice-principal, a learning coordinator, an education consultant, an education administrative specialist, etc. Note that the user with administrator permissions is not to be confused with a network administrator user responsible for administering and maintaining the remote learning platform and the virtualized education system. An example of a network administrator computing device is demonstrated and described below, by reference to FIG. 5 which illustrates an exemplary cloud-based virtualized education system that provides a remote learning platform.

Referring back to FIG. 2, upon logging into the remote learning platform, the interface of the software through which the administrator connects to the remote learning platform navigates to an administrator dashboard page (at 215). A number of user interface (UI) tools are presented on the administrator dashboard page. Each of the UI tools are selectable by the administrator. Upon selection, each of the UI tools trigger corresponding modules that provide access to specific administrator functions. As shown in this figure, the administrator dashboard provides administrator access to a teacher manager 220 module, a student manager 230 module, a class manager 240 module, an attendance reports 250 module, a note manager 260 module, and a setup 270 module.

Each of the modules is configured to allow the administrator to perform corresponding functions. Specifically, the teacher manager 220 module is configured to allow the administrator user to create, update, delete, and block teacher accounts (at 225). The student manager 230 module is configured to allow the administrator user to create, update, delete, and block student accounts (at 235). The class manager 240 module is configured to allow the administrator user to create, update, delete, and view classes (at 245). The attendance reports 250 module is configured to allow the administrator user to view student and teacher attendance records and percentiles (at 255). The note manager 260 module is configured to allow the administrator user to create, view, upload, download, search, sort, and delete documents (at 255). Additionally, the setup 270 module is configured to allow the administrator user to setup the administrator dashboard interface, such as allowing the look and feel to be changed by selection of color schemes, magnification levels, font sizes, dark mode/normal mode, etc.

Turning to another example, FIG. 3 conceptually illustrates a block diagram of a teacher dashboard and teacher functions 300 accessible through the teacher dashboard in connection with the remote learning platform hosted by the virtualized education system. To access the teacher dashboard and teacher functions 300, a user with teacher account permissions logs into the remote learning platform (at 310). Examples of users with teacher account permissions include, without limitation, a teacher, a substitute teacher, a teaching aide, and an education consultant, among others. Upon logging into the remote learning platform, the interface of the software through which the teacher connects to the remote learning platform navigates to a teacher dashboard page (at 315). A number of teacher user interface (teacher UI) tools are presented on the teacher dashboard page. Each of the teacher UI tools are selectable by the teacher. Upon selection, each of the teacher UI tools trigger corresponding teacher modules that perform specific functions and provide access to other specific teacher functions. As shown in this figure, the teacher dashboard provides teacher access to a live session 320 module, a recorded session 330 module, a class attendance report 340 module, and a teacher note manager 350 module.

Each of the teacher modules is configured to allow the teacher to perform corresponding class, session, and teacher-oriented functions. Specifically, the live session 320 module is configured to allow the teacher to set up and start a live session (at 325). The recorded session 330 module is configured to allow the teacher to list, view, and share recorded sessions (at 335). The class attendance report 340 module is configured to allow the teacher to view, sort, search, and filter student and class attendance (at 345) data and records. Finally, the teacher note manager 350 module is configured to allow the teacher to create, view, upload, download, search, sort, and delete documents (at 355).

Now referring to another example, FIG. 4 conceptually illustrates a block diagram of a student dashboard and student functions 400 accessible through the student dashboard in connection with the remote learning platform hosted by the virtualized education system. To access the student dashboard and student functions 400, a student user logs into the remote learning platform (at 410). Upon logging into the remote learning platform, the interface of the software through which the student user connects to the remote learning platform navigates to a student dashboard page (at 420). A number of student user interface (student UI) tools are presented on the student dashboard page. Each of the student UI tools are selectable by the student. Upon selection, each of the student UI tools trigger corresponding student modules that perform specific functions and provide access to other specific student functions. As shown in this figure, the student dashboard provides the student user with access to a live session entrance 430 module that is configured to allow the student user to enter a live session when invited by a teacher, a view recorded session 440 module that is configured to allow the user to select and watch audio-visual streams of recorded sessions made available by teachers and associated with past sessions on the remote learning platform, a student attendance report 450 module that is configured to allow the student user to view his or her attendance report for all classes or on a per class basis as well as past and current reports on attendance for the student user, and a student note manager 460 module that is configured to allow the student to create, view, upload, download, search, sort, and delete student documents (at 470).

By way of example, FIG. 5 conceptually illustrates a network architecture of a cloud-based virtualized education system 500 that provides a remote learning platform via a virtualized education attendance tracking and remote learning cloud application service that is configured to provide online attendance tracking for students and teachers. As shown in this figure, the cloud-based virtualized education system 500 includes a set of administrator/teacher mobile devices 510-512 (smartphone 510 and tablet computing device 512), a set of student or teacher computers with chip & prism camera setup 514-516, a network administrator workstation computer 518, a firewall 520, a wireless communication point 522 (e.g., a cell tower for cellular data communication), a gateway 524, a front-end web server 550 to connect to and login to the remote learning platform, a student, teacher, and administrator user database 560, and private and secure back-end cloud-based virtualized education system servers 570 that hosts the remote learning platform as a cloud application service (the "virtualized education attendance tracking and remote learning cloud application service") and includes integrated modules comprising the attendance tracking module, the facial recognition software system, the functional modules of the administrator dashboard, the teacher dashboard, and the student dashboard, as well as encryption modules for end-to-end encryption, and database management modules for saving attendance tracking data received from the attendance tracking module and stored in an attendance tracking database 580, in addition to storing recorded sessions to a cloud-based recorded session database 590.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

Many of the above-described features and applications are implemented as software in which the software performs runtime software processes that are specified as a set of instructions recorded on a computer readable storage medium (also referred to as computer readable medium or machine readable medium). When these instructions are executed by a processor, they cause the processor to perform the actions indicated in the instructions. Examples of computer readable media include, but are not limited to, CD-ROMs, flash drives, RAM chips, hard drives, solid state devices (SSDs), EPROMs, etc. The computer readable media does not include carrier waves and electronic signals passing wirelessly or over wired connections.

FIG. 6 conceptually illustrates an electronic system 600 with which some embodiments of the invention are implemented. The electronic system 600 may be a computing device, such as a desktop computer, a laptop computer, or another computing device, such as mobile computing device (e.g., a tablet computing device, a smart phone, a smart watch, etc.), or any other sort of computing or electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only memory 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing devices (also called "cursor control devices"). The output devices 635 display images generated by the electronic system 600. The output devices 635 include printers and all compatible display devices, such as commonly used liquid crystal displays (LCD) and organic light emitting diode (OLED) displays. Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

While the invention has been described with reference to numerous specific details, one of ordinary skill in the art will recognize that the invention can be embodied in other specific forms without departing from the spirit of the invention. For instance, FIGS. 1-4 conceptually illustrate processes in which the specific operations of the process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:
1. A virtualized education system that tracks student attendance and provides a remote learning platform comprising:
a private and secure back-end cloud-based virtualized education system server that hosts a virtualized education attendance tracking and remote learning cloud application service that provides a virtualized, remote learning platform, wherein the virtualized education attendance tracking and remote learning cloud application service is configured to support (i) live teaching via camera feed, (ii) attendance tracking via facial recognition, (iii) a teacher portal for a plurality of teachers comprising a particular teacher to administer content on an academic portal, create live teaching session links, share recorded teaching sessions, and view attendance reports of students, (iv) a student portal for students to consume content on the academic portal, access information posted by the plurality of teachers, attend live video teaching sessions, view recorded video teaching sessions, and interact to discuss content and information for live video teaching sessions and recorded video teaching sessions, and (v) an administrator portal for classroom oversight and attendance tracking;
a teacher computing device operated by the particular teacher, wherein the teacher computing device is automatically directed to navigate to the teacher portal upon accessing the virtualized education attendance tracking and remote learning cloud application service;
a plurality of student computing devices operated by a plurality of particular students connected to a live teaching session over the camera feed, wherein the plurality of student computing devices are automatically directed to navigate to the student portal upon accessing the virtualized education attendance tracking and remote learning cloud application service, wherein the live teaching session is accessed by each student computing device of the plurality of student computing devices via a live teaching session link created by the particular teacher and posted in the student portal;
a plurality of integrated modules that are integrated into the private and secure back-end cloud-based virtualized education system server, wherein the plurality of integrated modules comprise (i) an attendance tracking module, (ii) a facial recognition system, (iii) an encryption module, and (iv) a database management module configured to store student attendance records in an attendance tracking database and recorded teaching session videos in a recorded teaching session database, wherein the facial recognition system captures a live video feed of the plurality of particular students accessing the live teaching session and performs facial recognition of each particular student in the plurality of particular students in the captured live video feed to determine whether the particular student is present and in attendance during the live teaching session, wherein the attendance tracking module provides a connection to an attendance tracking system to track attendance of the plurality of particular students based on the presence during the live teaching session of each particular student in the plurality of particular students as determined by the facial recognition system;
a plurality of video cameras corresponding to the plurality of student computing devices, wherein each video camera is communicably connected to the corresponding student computing device and is configured to (i)

identify a unique hardware ID of the corresponding student computing device, (ii) transmit the unique hardware ID of the corresponding student computing device to the facial recognition system, (iii) capture and transmit a video stream of the particular student operating the corresponding student computing device to the teacher computing device operated by the particular teacher, and (iv) add the video stream of the particular student operating the corresponding student computing device during transmission to a plurality of live student video streams transmitted to teacher computing device operated by the particular teacher by the plurality of student computing devices connected to the live teaching session, wherein the video stream of the particular student operating the corresponding student computing device and the plurality of live student video streams from the plurality of student computing devices connected to the live teaching session are combined on a teacher screen of the teacher computing device to display an entire workroom view of all students connected to the live teaching session, wherein the entire workroom view provides the particular teacher a single view of the plurality of particular students connected to the live teaching session;

a user database that stores registered user profiles of students, current teachers, and administration users enrolled at a school;

a front-end web server to which the plurality of student computing devices connect online to access the virtualized education attendance tracking and remote learning cloud application service, wherein the front-end web server is configured to authenticate students operating connected student computing devices by (i) requiring user input of user credentials for each student accessing the virtualized education attendance tracking and remote learning cloud application service, (ii) verifying that the user credentials input by each student matches user credentials of the registered user profile corresponding to the student and stored in the user database, and (iii) triggering the facial recognition system to determine whether each authenticated student is authorized to attend the live teaching session via the live teaching session link posted in the student portal, wherein unauthorized students are denied access to the live teaching session and authorized students are allowed to join the live teaching session;

a plurality of dashboards comprising an administration dashboard for administrators of the school at which the plurality of particular students are enrolled, a teacher dashboard for a plurality of school teachers of the school, a student dashboard for a plurality of school students enrolled at the school, wherein the plurality of school teachers of the school comprises the particular teacher and the plurality of teachers, wherein the plurality of school students comprises the plurality of particular students, wherein the student dashboard provides a student interface to the student portal, wherein the teacher dashboard provides a teacher interface to the teacher portal, wherein the administration dashboard provides an administration interface to the administration portal, wherein the teacher dashboard enables the particular teacher to send invitations to video feed instructions and lessons in relation to the live teaching session and any other teaching session previously recorded, presented live via video feed, and upcoming live teaching sessions, wherein the student dashboard enables each particular student in the plurality of particular students to manage materials and notes for the live teaching session and any other teaching session previously recorded, presented live via video feed, and the upcoming live teaching sessions;

the attendance tracking database configured to store student attendance records for all teaching sessions, wherein the student attendance records are stored in association with each previously recorded teaching session and each live teaching session, wherein the attendance tracking database stores student invitations made by any of the plurality of school teachers for expected attendance in future teaching sessions; and the attendance tracking system that is communicably coupled to the attendance tracking module integrated into the private and secure back-end cloud-based virtualized education system server, wherein the attendance tracking system receives facial recognition information and the determination of presence for each particular student from the facial recognition system via the attendance tracking module and tallies student attendance and online activity, wherein the attendance tracking system provides the tallied student attendance and online activity for each teaching session to the database management module for persistent storage in the attendance tracking database.

2. The virtualized education system that tracks student attendance and provides the remote learning platform of claim 1, wherein the teacher computing device connects online to the front-end web server to access the virtualized education attendance tracking and remote learning cloud application service.

3. The virtualized education system that tracks student attendance and provides the remote learning platform of claim 2, wherein user input of user credentials are automatically encrypted, wherein the front-end web server further authenticates current teachers and administration users operating connected computing devices by (i) requiring user input of user credentials that are automatically encrypted and (ii) verifying that the encrypted user credentials match encrypted user credentials of the corresponding registered user profile.

4. The virtualized education system that tracks student attendance and provides the remote learning platform of claim 3, wherein the plurality of integrated modules comprises an encryption module that is configured to provide end-to-end encryption between (i) the private and secure back-end cloud-based virtualized education system server and the virtualized education attendance tracking and remote learning cloud application service and (ii) the computing devices of verified authenticated students, current teachers, and administration users.

5. The virtualized education system that tracks student attendance and provides the remote learning platform of claim 1 further comprising a smart, machine learning module that is configured to continually learn to recognize different students through a training set comprising different videos and images captured by the video cameras communicably connected to the corresponding student computing devices.

6. The virtualized education system that tracks student attendance and provides the remote learning platform of claim 5, wherein the smart, machine learning module is configured to continually learn to recognize different students as they age and grow.

7. The virtualized education system that tracks student attendance and provides the remote learning platform of claim 1, wherein each video camera is further configured to detect student movements, within an area in a field of view of the video camera corresponding to the student computing device.

8. The virtualized education system that tracks student attendance and provides the remote learning platform of claim 7, wherein student movements detected by the video camera comprise a particular student movement in which the particular student leaves the area entirely.

9. The virtualized education system that tracks student attendance and provides the remote learning platform of claim 8, wherein the particular student movement in which the particular student leaves the area entirely comprises a room departure movement in which the particular student leaves a room in which the video camera is operating.

10. The virtualized education system that tracks student attendance and provides the remote learning platform of claim 9, wherein a time of absence from the room is tracked by the private and secure back-end cloud-based virtualized education system server upon detection of the room departure movement.

11. The virtualized education system that tracks student attendance and provides the remote learning platform of claim 10, wherein the private and secure back-end cloud-based virtualized education system server compares the time of absence from the room to a threshold allowed time of absence and triggers a notification system to automatically send an absentee notification to an authorized party when the time of absence from the room exceeds the threshold allowed time of absence.

\* \* \* \* \*